United States Patent [19]

Brunvand et al.

[11] Patent Number: 4,924,435

[45] Date of Patent: May 8, 1990

[54] CIRCULATING CONTEXT ADDRESSABLE MEMORY

[75] Inventors: Eric L. Brunvand, Pittsburgh, Pa.; Alan L. Davis, Half Moon Bay, Calif.

[73] Assignee: Fairchild Semiconductor Corporation, Palo Alto, Calif.

[21] Appl. No.: 188,640

[22] Filed: May 2, 1988

Related U.S. Application Data

[63] Continuation of Ser. No. 765,391, Aug. 13, 1985, abandoned.

[51] Int. Cl.[5] .......................... G06F 15/40; G06F 7/04
[52] U.S. Cl. ................... 364/900; 364/965.6; 364/963.1
[58] Field of Search ... 364/200 MS File, 900 MS File, 364/300, 819, 728.03

[56] References Cited

U.S. PATENT DOCUMENTS

| | | | |
|---|---|---|---|
| 3,245,052 | 4/1966 | Lewin . | |
| 3,701,980 | 10/1972 | Mundy . | |
| 3,906,455 | 9/1975 | Houston et al. | 364/200 |
| 4,027,288 | 5/1977 | Barton et al. | 364/200 |
| 4,118,788 | 10/1978 | Roberts | 364/900 |
| 4,283,771 | 8/1981 | Chang | 364/900 |
| 4,451,901 | 5/1984 | Wolfe et al. | 364/900 |
| 4,527,253 | 7/1985 | Sato et al. | 364/900 |
| 4,554,631 | 11/1985 | Reddington | 364/300 |

*Primary Examiner*—Eddie P. Chan
*Attorney, Agent, or Firm*—McCubbrey, Bartels, Meyer & Ward

[57] ABSTRACT

A memory system for storing and retrieving data sequences of symbols in response to a query sequence. Each of the data sequences and the query sequence is made up of three types of symbols, constants, delimiters, and variables. A data sequence is retrieved in response to a query sequence if the two sequences can be made identical by replacing each variable in each sequence by constants or combinations of constants and delimiters, said combinations beginning and ending with a delimiter. The data sequences are stored in a circulating memory store in which each symbol periodically passes by a number of Tap points at which it is available for reading. Each of the Tap points contains a processor which is capable of comparing the stored data sequences with the query sequence. A unique sub-system is provided for entering new data sequences into the circulating memory store without interrupting the operation of the data retrieval functions. This data entry technique automatically collects fragmented storage areas which were to small to store the new data sequence and combines these into a larger space into which the new data sequence is inserted.

27 Claims, 6 Drawing Sheets

DATA WORD

| | I.D. | | DATA | | | |
|---|---|---|---|---|---|---|
| | T0 | T1 | D0 | D1 | D2 | ... D31 |
| OPEN DELIMITER | 1 | 0 | 0 | 0 | ... | ... |
| EMPTY | 1 | 0 | 0 | 1 | ... | ... |
| UNSEEN RECORD | 1 | 0 | 1 | 0 | ... | ... |
| SEEN RECORD | 1 | 0 | 1 | 1 | ... | ... |
| CLOSING DELIMITER | 0 | 1 | 0 | ... | | |
| END OF DATA SEQUENCE | 0 | 1 | 1 | ... | | |
| CONSTANT | 0 | 0 | ... | | | |
| VARIABLE | 1 | 1 | ... | | | |

QUERY SEQUENCE WORD

| | I.D. | | DATA | | | |
|---|---|---|---|---|---|---|
| | T0 | T1 | D0 | D1 | D2 | ... D31 |
| OPEN DELIMITER | 1 | 0 | JUMP ADDRESS | | | → |
| CLOSING DELIMITER | 0 | 1 | 0 | ... | ... | |
| END OF QUERY SEQUENCE | 0 | 1 | 1 | ... | ... | |
| CONSTANT | 0 | 0 | ... | | | |
| VARIABLE | 1 | 1 | ... | | | |

FIGURE 2

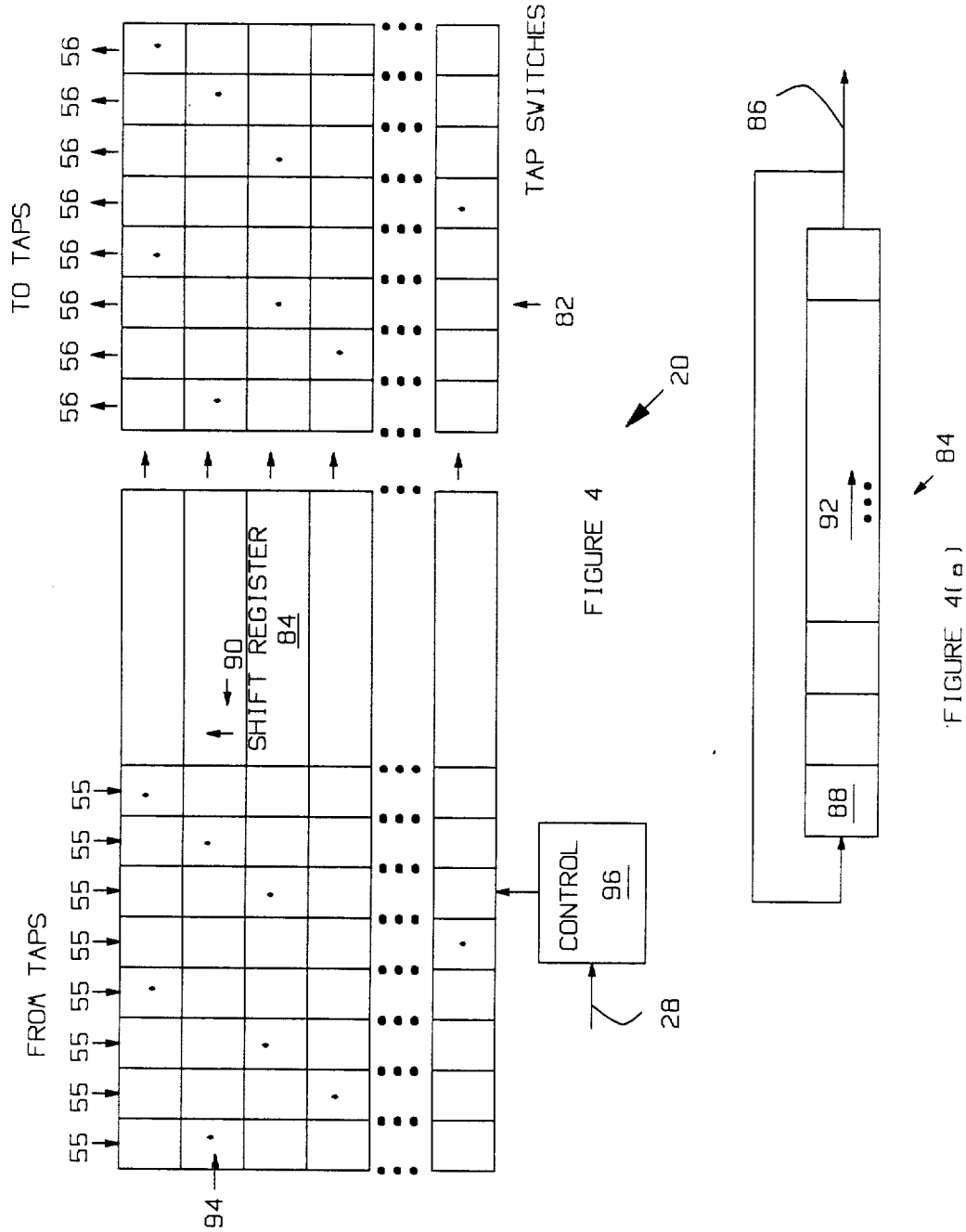

CIRCULATING CONTEXT ADDRESSABLE MEMORY

This application is a continuation of application Ser. No. 765,391, filed Aug. 13, 1985, now abandoned.

The present invention is directed generally to the field of data processing systems and more particularly to memory systems for use in data processing systems.

Essentially all data processing systems used in artificial intelligence systems require that information be stored and selectively retrieved. The information is normally organized as a database, stored in a memory, which consists of a number of records which are to be retrieved one at a time. Normally, each record is retrieved as a unit. The simplest example of a database retrieval involves retrieving all records that contain one or more key words. For example, the database might consist of all the articles in a particular set of scientific journals, one article per record. Here one would like to retrieve all articles containing one or more key words, such as all records containing the words "computing" and "artificial intelligence".

In "expert systems" the database is codified into rules which must be searched repeatedly for rules conforming to a given specification. This given specification may be referred to as a "query sequence". This type of search, referred to as a "rule-based" search, differs significantly from the search for records containing one or more key words described above. When the expert system is given a problem, it must choose which of the many rules in the database to apply next to the problem at hand. This choice will depend on the data and relationships between the variables in the problem being solved. The expert system must select those rules which contain the same data and/or relationships between the variables. For example, these rules may be of the form:

If <condition> then <action or conclusion>.

One of the rules in the data base might be as follows: if (x eats) then (x is hungry).

If the problem contains the information "Peter eats", the system would be faced with the task of searching all the rules for those containing (x eats). Here x is a variable element which may be replaced by any element in the known information. The above rule together with any others involving "eats" would be retrieved. Once the system has retrieved the rule, it substitutes Peter for x and then concludes that Peter is hungry.

The rule-based search differs significantly from the simple key word or key element search wherein all records containing one or more key words are retrieved. In a rule-based search, both the number and order of the elements contained in the database records are important. Consider a database containing the three records (a,x,b), (a,z,b), and (b,(d,e),a). A request for all records containing "a" and "b" would retrieve all of the above records. However, a request for all "rules" of the form (a,b) would not be satisfied by any of the records, since each record contains 3 elements and the requested rule contains only two. A request for all rules of the form (a,?,b), where ? denotes a variable element which may be satisfied by any constant, sub-expression, or another variable, would retrieve the first two records, but not the third, since "a" and "b" appear in the wrong order in the third record. Hence, even with the concept of a variable, a rule-based retrieval system cannot conveniently be used to select records based on the key elements in an unspecified order.

Conversely, a key word search system is difficult to use for rule-based searches. To perform a rule-based search on a key word system, one must use two steps. First, all records containing the elements in the rule are retrieved and stored in some auxillary storage. Then each of these records must be separately examined to determine if it contains the elements in the proper order with no additional elements.

A major problem encountered in implementing artificial intelligence systems using presently available computer hardware is the time required to search a large database for records matching a particular query sequence. To be useful, such a system must contain a very large number of records. Since the time needed to search the database is proportional to the length of the database, as a system having a fixed searching speed becomes "smarter" through the addition of new information in the form of new rules, it also become slower. This problem can only be solved by increasing the searching speed of the system as the size of the database to be searched is increased.

In spite of the numerous improvements which have been made in integrated circuit technology, modern computers differ very little from the original Von Neumann designs. The classical Von Neumann machine consists of a central processing unit and a separate memory organized into words of fixed length. The processing unit fetches data from the memory, one word at a time, by specifying the location of the desired word relative to the beginning of the memory. To perform the above search, a Von Neumann type central processing unit would sequentially retrieve each word of the database from the memory and would then compare it to each of the words in the query sequence which are also stored in the memory. Since there is a limit to the speed at which a single processing unit can run, Von Neumann type machines in practice are limited as to the size of the database that may be accessed. Even at speeds of 10 million compares per second, a Von Neumann machine would be hard pressed to search the contents of a library which contained, for example, only the law reporter series for the various jurisdictions in the United States.

In addition to its speed limitations, the Von Neumann type architecture also presents a number of limitations because of its inherent hardware dependence. In order to specify a memory address, a fixed number of address lines are used. A system with N address lines can address a memory of $2^N$ words and no more. To increase the memory capacity beyond this limit, one must increase the number of address lines. This involves both hardware and software alterations, since most systems specify a maximum memory size that the computer's instruction set is capable of addressing. Furthermore, if a portion of the memory is rendered inoperative by a malfunction of one of its components, it is difficult to transfer this storage to an undamaged segment of memory without reprogramming. As the size of the memory is increased in response to the need to store increased numbers of data records, the probability of such a malfunction in one component of the memory increases.

Finally, a large database search problem will require the use of only a small fraction of the instructions present in the central processing unit. A typical central processing unit has literally hundreds of instructions that it is capable of executing, varying from input/output instructions for dealing with the outside world to mathematics instructions for combining memory words which represent numbers. The database search problem requires at most 10 to 20 of these instructions. Hence the database search problem under-utilizes the instruction repertoire of the central processing unit.

The speed limitations of the central processing unit may be overcome to some degree by constructing a system having multiple central processing units wherein each has access to the memory. However, this solution has its limitations. The number of central processing units that can share a given memory is ultimately limited by the time it takes each central processing unit to access the memory. If the memory bus must be dedicated to each central processing unit for 1/10th of the time, then no more than 10 central processing units can effectively share the same memory. Thus, replicating the central processing unit is not the best solution to the speed limitations of Von Neumann machines.

Even if one could effectively reduce the search time using replicated central processing units, one is still left with the limitations imposed by the hardware. Sooner or later one will want to expand the database beyond these hardware limitations, which is difficult to do in the Von Neumann type machines. Ideally, one would like to have a modular memory which could be added to a system whenever increases in the size of the database demand it without the concomitant necessity of increasing the number of address lines. This ability to expand the memory will become increasingly more important in those artificial intelligence systems where one seeks to build a machine which is capable of acquiring and using ever increasing amounts of information.

SUMMARY OF THE INVENTION

The present invention consists of a memory system for storing and retrieving data sequences of symbols in response to a query sequence. Each of the data sequences and the query sequence is made up of three types of symbols, constants, delimiters, and variables. A data sequence is retrieved in response to a query sequence if the two sequences can be made identical by replacing each variable in each sequence by constants or combinations of constants and delimiters, said combinations beginning and ending with a delimiter. This determination is made by carrying out a number of pairwise comparisons between symbols chosen from each data sequence and the corresponding query sequence symbols. Those data sequences which successfully pass each of the pairwise tests are retrieved.

The data sequences are stored in a circulating memory store in which each symbol is stored as a sequence of binary bits which periodically passes by a number of Tap points at which it is available for reading. Each of the Tap points contains a processor which is capable of comparing the stored data sequences with a query sequence consisting of a sequence of symbols of the same type as those used to represent the data stored in the circulating memory store. The memory system contains a separate storage buffer for holding this query sequence and translating it into a sequence of binary bits which may be conveniently compared to the sequence of binary bits representing the data sequences in the circulating memory store. A unique sub-system is provided for entering new data sequences into the circulating memory store without interrupting the operation of the data retrieval functions. This data entry technique automatically collects fragmented storage areas which were too small to store the new data sequence and combines these into a larger space into which the new data sequence is inserted. The operation of the various memory functions is under the control of a built-in processor which allows the system to be integrated into larger computer systems with a minimum of overhead.

It is an object of the present invention to provide a memory system for the storage and retrieval of rules applicable to rule-based artificial intelligence systems in which the rules are retrievable by specifying their content as opposed to their location in the memory.

It is a further object of the present invention to reduce the time needed to retrieve said records by employing a replicated concurrent data processing system in which a plurality of processing units search for all data sequences satisfying a given query sequence.

These and other objects will become clear from the following detailed description of the invention and from the accompanying drawings.

SUMMARY OF THE DRAWINGS

FIG. 2 is a summary of the data formats used to store symbols in the preferred embodiment.

FIG. 4 is a block diagram of the query storage buffer used in the preferred embodiment.

FIG. 4a illustrates a shift register used to implement the query storage buffer as shown in FIG. 4.

DETAILED DESCRIPTION OF THE INVENTION

Choice of Memory Organization

Figure 1:
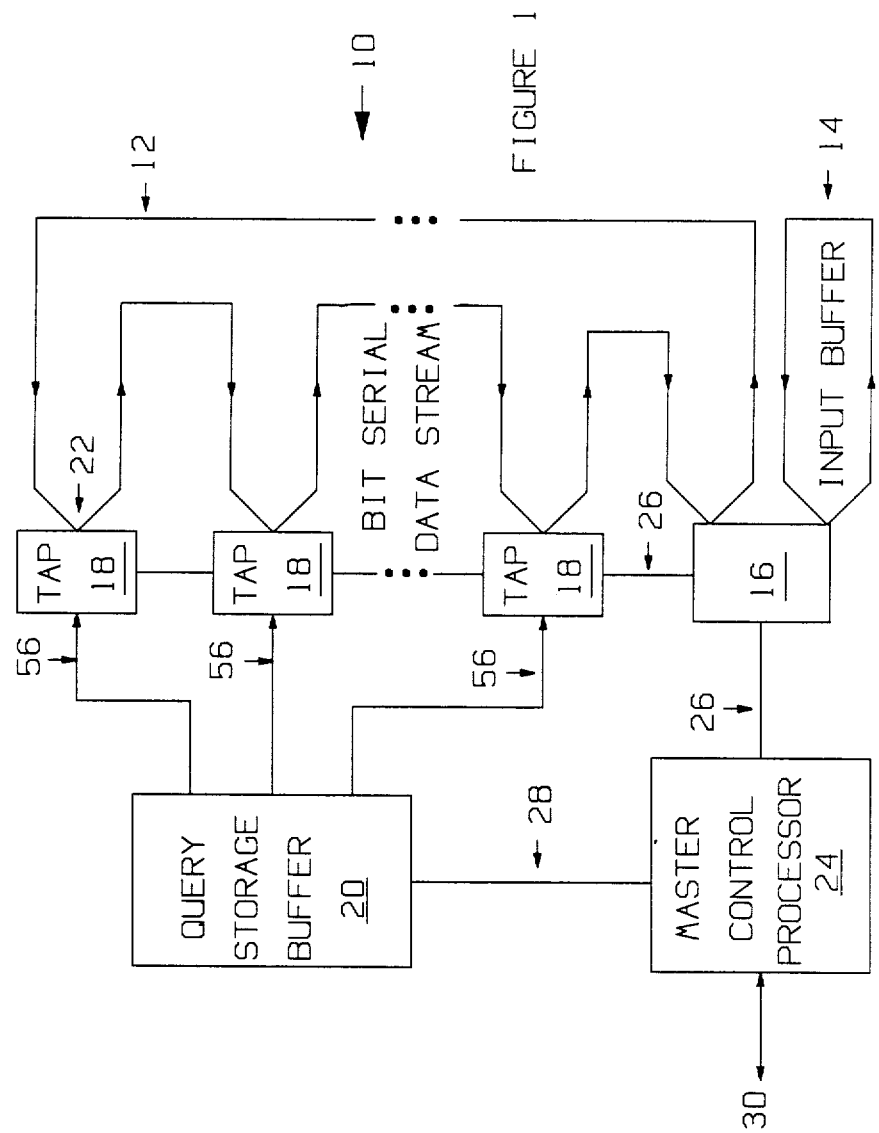
FIG. 1 is a block diagram of the preferred embodiment of the present invention.

As pointed out above, the search time is proportional to the length of the database being searched. Hence, the search time may be reduced by breaking the database into several subunits, each with its own processing unit. This is equivalent to dividing the search task between a number of small Von Neumann machines, each with sufficient memory to hold the key words in the search list and one or more words of the database. The fastest search with such a system would be realized with a memory which has one processing unit built into each word of memory. Then in one memory cycle, the memory could compare itself to a key word and identify each record in which the key word appeared. The optimum ratio of database words to processing units will clearly depend on the complexity of the processing unit relative to that of the memory. Since the processing unit needs only a few instructions to carry out the search function, a relatively high density of processing units is possible. This type of highly replicated modular structure is particularly well suited to modern VSLI integrated circuit fabrication techniques.

This type of architecture is also well suited to the database search problem in that the processing time does not increase as the database size increases, since each unit of memory capacity carries its own searching capacity with it in the form of its built-in processing unit. Hence the computing capacity of the system expands as the database expands. Furthermore, the system's central processing unit, as opposed to that of the processing units which provide the search function in memory, has relatively little overhead in this type of design. It does not need to keep track of addresses or other data associated with the contents of the memory. It has only to send the query sequence to a memory unit made up of a number of modules with instructions as to where to store the results of the search.

In principle, the data sequences can be stored in any of a number of physical memory devices. All of these devices include a memory of some sort for holding the data sequences and a processor for comparing these sequences with the query sequence. This comparison is carried out as a sequence of pairwise comparisons involving one symbol from the data sequence and one symbol from the query sequence. The time needed to search the stored data sequences for those that match a particular query sequence will depend on the speed of the comparator circuits which make these pairwise comparisons and the number of such circuits employed. Systems in which the ratio of comparators to memory locations is large will retrieve the matching sequences in the least amount of time; however, these systems will have a lower memory density and higher cost in general than systems with fewer comparators in which the circuitry that would have gone into additional comparators is converted to additional memory.

In the apparatus of the present invention, a circulating memory storage system is used for the data sequences, the query sequence remains static, and the data sequences are matched against it as each data sequence streams by the query sequence. Here, each data sequence is tested separately against the query sequence, one at a time. If a particular data sequence matches the query sequence, it is read out before the processor goes on to test the next data sequence. If it does not match, the processor waits for the remainder of the sequence to pass, and then it tests the next stored data sequence.

Most circulating memory systems are "bit serial" in nature. For example, magnetic disks generally read and write tracks which are a sequence of single bits obtained by converting the data words into a serial sequence of bits and then writing those bits into the circulating storage medium. There are two possible design stradegies given the serial nature of the storage medium. First, one could construct a system in which the serial bit stream is converted back into words, and the words then compared to the words in the query sequence. Such a system would use comparators which are one word wide and test one query word in a single "compare cycle". The second alternative would be to convert the query sequence words into a corresponding bit serial representation and then compare the two bit serial representations in a comparator which is only one bit wide. If the data words were N bits long, then N compare cycles would be needed; however, the cost of the comparators would be greatly reduced since the N bit wide comparator of the above scheme would be replaced by a single one bit wide comparator.

Although the first of these alternatives would appear to provide faster comparisons, since it requires only one comparison cycle to test each query word against its corresponding data word as compared to the N comparison cycles needed by the second alternative, this is not in fact the case. The time required to make a comparison in the first case is the sum of the time needed to collect the N bits which make up the data word from the bit serial stream and convert these into a data word which is then given to the N bit wide comparator. This operation would be carried out by shifting the data into a "serial-in parallel-out" shift register. Since the time needed to shift the N bits into a serial-in parallel-out shift register is at least as long as that needed to make N compares in a single exclusive OR gate, the first alternative takes at least as long to make a comparison as the simple one bit serial comparison algorithm. In addition, it is more costly, since it requires one serial-in parallel-out shift register per Tap point in addition to an N bit wide comparator. Hence, the bit serial approach is the method of choice for constructing a pattern addressable memory based on a circulating storage medium which is bit serial in nature.

MATCHING ALGORITHM

The memory system of the present invention is designed to retrieve all data sequences which correspond to a given query sequence. Each data sequence is made up of a sequence of symbols. Each symbol belongs to one of three possible types, constants, variables, and delimiters. The query sequence is likewise constructed from these three types of symbols. A stored sequence is defined to correspond to a query sequence if the two sequences can be made identical by replacing each of the variable elements in each of the sequences by a constant or some combination of constants which begins and ends with a delimiter. The constants or combinations thereof may be different for each of the variables replaced. For example, the sequence (a,d,?,e,c,(a,b),g)

may be made identical to the sequence (a,d,q,e,c,?,g)

by replacing the ? in the first sequence by q and the variable in the second sequence by the combination (a,b).

The matching algorithm is implemented as a series of pairwise matches between one element taken from the query sequence and one element taken from the data sequence being tested. At each successful pairwise match, the next elements to be used in the next match must be specified, since when sub-expressions are present, jumps around these expressions are often necessary. This may be illustrated using the above two sequences, the second sequence being the query sequence which is being matched against a data sequence represented by the first sequence. The match starts with "(" in the first sequence being matched against "(" in the second sequence. This process continues with the second and third elements. At the fourth match, the symbol "q" in the query sequence is matched against the variable "?" in the data sequence. Since "?" matches anything, this match is successful. The process continues until the "?" in the query sequence is matched against the "(" of the sub-expression contained in the data sequence. Since "?" matches the next element which in this case is the entire sub-expression, (a,b), the next element to be tested in the data sequence will be the "g" after the ")", not the "a" after the "(". Hence, when a variable in one sequence is matched against a "(" in the other sequence, the next symbols to test are the one following the "?" and the one following the ")" which corresponds to the "(" which was matched against the "?". A data sequence is said to correspond to the query sequence if each of the above pairwise matches is satisfied.

In addition, the present invention implements an "almost exact" matching mode in which data sequences which begin with the sequence specified by the query sequence are returned even though they are longer than the query sequence. For example, if the query sequence (a,d) were used in the almost exact match mode, all data sequences which begin (a,d, . . . would be retrieved. This mode allows one to retrieve data sequences of differing lengths which begin with the same sequence without specifying all possible combinations of ending sequences.

SUMMARY OF THE HARDWARE IMPLEMENTATION

The preferred embodiment of the present invention is shown schematically in FIG. 1 at 10. It includes a circulating memory configured as a bit serial data stream 12 and a number of identical data processing units 18 which access this stream at a number of different Tap points, an example of which being shown at 22.

In the preferred embodiment, the bit serial data stream 12 consists of a long shift register made-up of one bit memory cells. Each symbol of the stored data sequences is stored as a binary coded number in a contiguous block of these one bit memory cells. The symbols stored in the shift register are made to circulate past each Tap point by shifting the contents of each memory cell to the next adjacent memory cell, the contents of the last memory cell being shifted into the first memory cell.

Other circulating memories which are more than one bit wide will be obvious to those skilled in the art. For example a shift register which is N bits wide, where N is the number of bits used to store each symbol, could be used to create a circulating memory in a manner analogous to that described above using a one bit wide shift register.

The preferred embodiment uses a fixed number of memory cells to store each symbol. Embodiments in which different numbers of memory cells are used to store different symbols will be obvious to those skilled in the art. In a system using variable numbers of memory cells per symbol, each symbol is preceded by a code indicating the beginning of a symbol and a means for defining the end of the symbol is provided, e.g., a stop code.

Each of the processing units 18, hereinafter referred to as a Tap, is connected to a query storage buffer 20 which contains the query sequence to be used in the search of the data sequences stored in said bit serial data stream 12. An input processor 16 is also attached to the bit serial data stream 12. This processor together with the input buffer 14 is used to enter data into the bit serial data stream 12. The individual Taps communicate with each other on an internal bus 26 which is also used to communicate with the master control processor 24. The master control processor 24 communicates with the external processing system in which the memory of the present invention functions over an external bus 30. The master control processor 24 is also connected to the query storage buffer 20 by a bus 28 which is used to input the query sequence into the query storage buffer 20.

Before a search can be initiated, the bit serial data stream 12 must be loaded with the data sequences to be searched. This function is performed by the input processor 16 which receives the data sequences to be stored from the master control processor 24. The operation of this input system will be described in detail below. Individual data sequences can be added to the bit serial data stream 12 at any time.

Once the bit serial stream is loaded, a search for all data sequences corresponding to a given query sequence is carried out as follows. First, the query sequence is relayed to the query storage buffer 20 by the master control processor 24. Second, the Taps 18 and the stored data sequences circulating in the bit serial data stream 12 are initialized for a search as described below. Third, the Taps 18 are instructed to find a match to the query sequence in the query storage buffer 20. Each time one of the Taps 18 finds a data sequence which matches the query sequence, it sends the location of that data sequence to the other Taps 18 on the internal bus 26. The first Tap 18 to encounter that data sequence then sends it over internal bus 26 to the output handler which is contained in the master control processor 24. The master control processor 24 relays the data sequence in question to the processing system in which the memory of this invention is operating.

DATA FORMATS

Each data sequence is made up of a sequence of symbols. Special symbols are used to signal the beginning and end of each data sequence. Each symbol is represented by a storage "word" which is a contiguous block of one bit memory cells. In the preferred embodiment each storage word is 34 bits long. These 34 bits circulate in the bit serial data stream 12 if the symbol is one of the symbols comprising a data sequence. The query storage buffer 20 contains 34 bit storage words for storing the query sequence symbols in the same 34 bit format. Each storage word is divided into an identification group and a data group. The first two bits of each word are identification bits which indicate the character of the data stored in the remaining 32 bits, referred to as the data bits. In storage words containing constants or variables, the data bits are used to store the "name" of the constant or variable. The name stored for a variable is not used by the apparatus of the present invention. This optional name is provided to make the data sequences read more like the English language. It may also be used by the data processing system coupled to the apparatus of the present invention.

In storage words which contain delimiters or which are used to signal some system function such as beginning and end of data sequence, one or more of the data bits may be used in conjunction with the identification bits to specify the function. The various identification bits and associated data bits are summarized in FIG. 2. In addition to the special symbol for ending data sequences, there are special symbols, "seen" and "unseen", for indicating that a particular data sequence has been already tested in a match against the query sequence, and a special symbol, "empty" indicating that the storage word is available for use in storing a new data sequence. Either the seen or unseen symbol is used to indicate the beginning of a data sequence. When a search is initialized, the first symbol of each data sequence is changed to an "unseen" symbol. After a Tap compares this data sequence to the query sequence, the first symbol is changed to a "seen" symbol.

The symbols which make up the query sequence are coded in a similar format, as indicated in FIG. 2. However, the concepts of seen and unseen data sequences and empty data storage words are not applicable here; hence only five types of data storage words are defined in the query sequence. These data storage words are the same as the corresponding storage words in the stored data sequences with the exception of the open delimiter.

The data bits of a query sequence open delimiter are used to store the location of the corresponding closing delimiters. As pointed out above, in addition to a simple constant, a variable in a data sequence may match an entire sub-expression in the query sequence. Each such sub-expression begins with an open delimiter. Hence, this case is signaled by a variable in the data sequence being matched against an open delimiter in the query sequence. When an open delimiter in the query sequence is matched against a variable in the data sequence, the Tap 18 making the match must jump to the closing delimiter in the query sequence corresponding to the open delimiter in question and then continue the matching operation starting with the query symbol after the closing delimiter. This is accomplished in the present invention by storing the location of the matching closing delimiter in the data bits of the query storage word containing the open delimiter. When an open delimiter in the query sequence matches a variable in the data sequence, the Tap 18 jumps to the location in the query storage buffer 20 specified in the data bits of the open delimiter and then continues the match using the symbol after the one specified in the jump. The jump location is encoded by setting one data bit in the open delimiter storage word for each symbol in the query sequence that is to be jumped over. Hence, if the query sequence contained the sub-expression (a,b), the open delimiter would have the first two data bits set to ones.

TAP PROCESSOR

Figure 3:
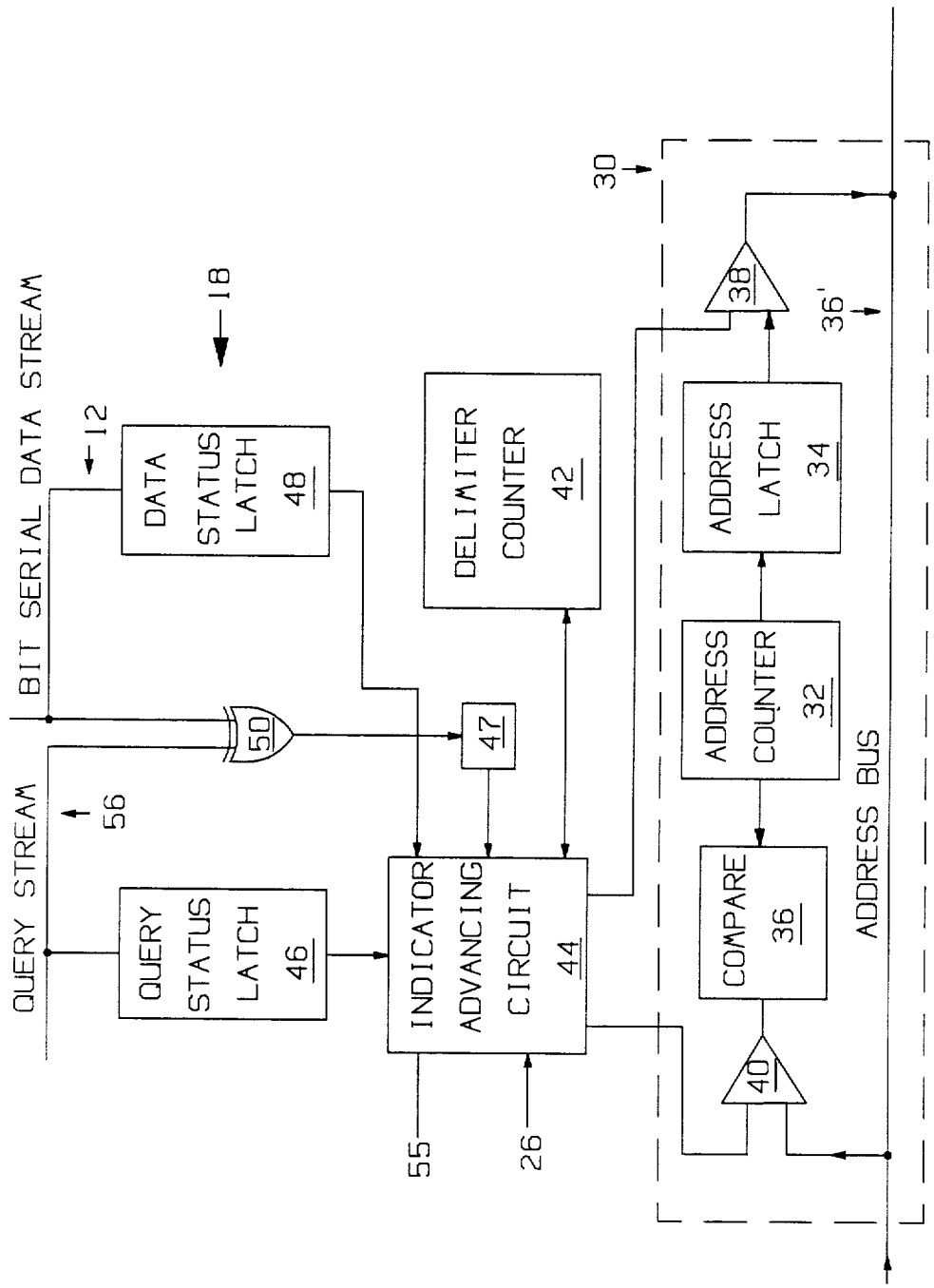
FIG. 3 is a block diagram of one of the Taps used in the preferred embodiment.

A block diagram for one of the Taps 18 is shown in FIG. 3. Each Tap 18 includes a means for comparing a data sequence symbol with a query sequence symbol. The data sequence symbol is inputted to the Tap 18 as a sequence of bits which are circulating in the bit serial serial data stream 12. The query sequence symbol to be used in the comparison is likewise inputted to the Tap 18 in a bit serial format. The conversion of the query symbol to this format is performed in the query storage buffer 20 as will be described below. The bit serial representation of the query symbol, referred to as the query stream, is inputted to the Tap on line 56 which connects the Tap 18 in question with query storage buffer 20.

Each Tap 18 contains 4 major elements. First, each Tap contains address logic circuitry 30 which keeps track of the "address" of the data sequence currently being read at said Tap point 22 associated with the Tap in question. This circuitry consists of an address counter 32 for computing the current address in the bit serial data stream 12 which is passing the Tap 18, an address latch 34 for storing an address for communication to the other Taps on the address bus 36' which is part of bus 26 which connects the various Taps in the system, and a compare circuit 36 for testing the current address against one communicated on said address bus. Although the current address of a data sequence stored in the bit serial data stream 12 is not accessible outside of the apparatus of the present invention, internal to the apparatus, the data sequences are accessible by address. Each Tap 18 computes its address relative to the other Taps and relative to some point in the bit serial data stream 12 which is redefined whenever the address circuitry 30 is initialized. This is accomplished by storing a predetermined number in each of the address counters 32 when the address circuitry 30 is initialized. This number is different for each Tap 18. It is the number of data bits in the bit serial data stream 12 between this Tap and the first Tap. As each data bit in the bit serial data stream 12 passes a given Tap, that Tap's address circuitry 30 increments the address counter 32 located in that Tap. If the operation being performed by a Tap 18 requires it to communicate the address of a data sequence it has found to another Tap 18, it does so by latching this address into the address latch 34 which is then gated onto the address bus 36' by gate 38. For example, when a match is found between a data sequence and the query sequence, the Tap 18 that found the match relays the address of the data sequence in question to all of the other Taps. When another Tap 18 encounters this address, it switches the bit serial data stream 12 to the output handler which is contained in the master control processor 24. In the preferred embodiment, all of the Taps 18 share the same address bus, and a bus arbitration scheme is employed to resolve conflicts between two or more competing Taps.

The second major element present in each Tap 18 is the delimiter counter 42 used to find the closing delimiter corresponding to a given open delimiter marking a sub-expression in a data sequence. When a "?" in the query sequence is matched against an open delimiter in the stored data sequence, the Tap 18 must wait until the corresponding closing delimiter is encountered in the data stream before resuming the comparison of the data and query sequences. This is accomplished by counting the delimiters that pass the Tap 18 until the one corresponding to the open delimiter in question is encountered. Matching then resumes with the data sequence symbol following said closing delimiter. Since the sub-expression being skipped may contain another sub-expression as part of it, the delimiter counter 42 must count both "(" and ")". The delimiter counter 42 is set to an initial state when a variable query symbol is compared to an open delimiter data sequence symbol. It is incremented on each "(" and decremented on each ")". So long as delimiter counter 42 has a value different from the initial state, the circuitry which compares the query stream to the bit serial data stream is inhibited. When the delimiter counter 42 returns to its initial state, the matching operation is resumed. The open delimiter marking the beginning of the sub-expression in question is also counted in this process. The delimiter counter acts both as a means for identifying the closing delimiter corresponding to given open delimiter in a data sequence and as a "hold" means for indicating that a data symbol corresponding to a given query symbol is not yet available at the Tap 18.

The third major element of each Tap 18 is the comparing means for comparing the data and query sequence symbols. As will be discussed in detail below, the query storage buffer 20 decodes the query sequence symbols into a bit serial stream having the same format as that used for the data sequence symbols circulating in the bit serial data stream 12. Since both streams are bit serial, a comparator in the form of an exclusive-OR gate 50 is sufficient to compare the two bit streams. The output of the gate 50 is connected to a flag 47 which is set to a first state when the first symbol of the data sequence being tested is compared to the first symbol of the query sequence. If any of the comparisons fails to find a match between the data sequence symbol being read at the Tap 18 and the corresponding query symbol, the flag 47 is set to a second state. If the flag is still set to said first state after the last symbols of the data and query sequence are compared, the data sequence in question is to be retrieved. An indicator advancing circuit 44 monitors this flag, and matching is discontinued for the current data sequence whenever a mismatch is noted.

The fourth major element of each Tap 18 is the indicator advancing circuit 44. The indicator advancing circuit 44 communicates with the query store buffer 20 via signal line 55 as discussed below and with the master control processor 24 on the internal bus 26. It also communicates with other Taps via the internal bus 26 which contains the address bus 36' as a part thereof.

The main function of the indicator advancing circuit 44 is to supervise the comparison of the query sequence and data sequence serial bit streams and to specify the next query sequence symbol to be sent to the Tap 18 from the query store buffer 20. The symbols being compared in each bit stream can be divided into four types, constants, open delimiters, close delimiters, and variables, for the purpose of making this comparison. There are 16 possible combinations of pairwise comparisons to be made at the Tap 18. In making these comparisons, the indicator advancing circuit first compares the identification bits of the symbols. These bits are stored in the query status latch 46 and the data status latch 48, respectively. If the identification bits indicate a possible match between the symbols, the indicator advancing circuit 44 goes on to compare the data bits of the symbols.

The possible outcomes of these comparisons are summarized in Table 1. In each case, the indicator advancing circuit 44 must determine if the match is to continue and, if it is to continue, which symbol of the query sequence is to be used at the next comparison. The choice of the next query sequence element is communicated to the query store buffer 20 by signals on the communication line 55. Each time a pulse is sent on line 55, a pointer, referred to as the query sequence pointer for this Tap, is advanced. Each Tap controls one query sequence pointer which specifies the query symbol to be sent to the Tap. If no pulses are sent, the query storage buffer 20 repeats the bit serial stream for the current symbol. If the Tap were to send one pulse on this line, the query storage buffer 20 would send the next symbol in the query sequence. If two pulses were sent, the query storage buffer 20 would skip one symbol in the query sequence and the next comparison would be carried out between the next symbol in the bit serial data stream 12 and the symbol stored two locations from the present one in the query storage buffer 20.

In all but two cases, an examination of the identification bits and at most two of the following data bits in each stream will be sufficient for the indicator advancing circuit 44 to make its decision. These two cases involve the matching of a constant in the query stream against a constant in the bit serial data stream 12 and the matching of an open delimiter in the query stream against a variable in the bit serial data stream 12. In the first of these cases (case 1 in Table 1), the indicator advancing circuit 44 must examine the entire data words in both streams to ascertain if the two constants match. If they do not, the matching process is discontinued for this data sequence. If they match, the query sequence pointer in the query storage buffer 20 is advanced to indicate the next query sequence element by sending a pulse to the query storage buffer 20 on line 55.

In the second of these cases (case 15 in Table 1), a variable in the data sequence is matched against an open delimiter in the query sequence. Since this variable is to be matched with the entire subsequence which begins with this open delimiter, the query sequence pointer must be advanced to the corresponding close delimiter in the query sequence. As discussed in above, each open delimiter in the query sequence is coded with the number of symbols to be jumped to reach the corresponding closing delimiter. This coding is in the form of a sequence of "1" bits in the data bits of the storage word used to store said open delimiter, one "1" for each symbol that must be skipped. Thus if the closing delimiter were 4 symbols away in the query sequence, the open delimiter would contain 4 "1". The indicator advancing circuit 44 merely relays these "1"'s to the query store buffer 20 on line 55. Circuitry in the query storage buffer 20 advances the query sequence pointer. Once the query sequence pointer has been advanced to the corresponding closing delimiter, the indicator advancing circuit 44 treats this case as if it involved a constant and a variable matched; i.e., the query sequence pointer is advanced one symbol in the query sequence and the matching continues with the next symbol in the bit serial data stream 12.

In the complementary case involving a variable in the query sequence which is matched against an open delimiter in the data stream (case 12 in Table 1), the indicator advancing circuit 44 must wait until the corresponding closing delimiter in the data stream passes before advancing the query sequence pointer. This is accomplished by counting the number of open and closing delimiters in the delimiter counter 42 as discussed above.

In all of the 13 remaining cases, the match is either continued, in which case the query sequence pointer is advanced to the next query sequence symbol, or the match is discontinued, in which case the position of the query sequence pointer is left unchanged.

In all cases (Cases 5 through 8) in which a closing delimiter is encountered in the query sequence, the indicator advancing circuit 44 must check the data bits to see if this closing delimiter is in fact the end of query sequence marker. If it is said marker and the indicator advancing circuit 44 has been instructed to operate in the partial match mode described below, then the indicator advancing circuit 44 will treat this case as if the bit serial data stream 12 contained a closing delimiter indicating the end of the data sequence. If the indicator advancing circuit 44 is operating in the full match mode, a match will only occur if the data stream also contained an end of data sequence closing delimiter. The remaining cases listed in Table 1 are self explanatory.

In addition to supervising the matching functions, the indicator advancing circuit 44 also supervises the deleting and outputting of data sequences, initializing the data sequence identification bits, and initializing the memory as a whole. These operations are carried out in response to signals from the master control processor 24. Deleting and outputting data sequences require that the indicator advancing circuit 44 match the address of the current data sequence being examined with that of the data sequence to be outputted or deleted. This address is placed on the address bus 36' as a result of a previous matching instruction. The instruction to delete or output is relayed by the master control processor 24. When this address matches the address of the bit serial data sequence currently being read by said Tap 18 the appropriate action is taken. If the data sequence is to be outputted, it is copied to the output handler which is located in the master control processor 24. If the data sequence is to be deleted, the identification bits and first two data bits of each word in the data sequence are set to the value indicating that the word is empty space.

To delete a specific sequence, that sequence is sent to the apparatus of the present invention as a query sequence. The matching operations results in this sequence being "retrieved," i.e., its address is placed on the address bus 36'. The delete instruction is then given.

Initializing the memory prior to a search for all data sequences that correspond to the query sequence involves setting the first two data bits of the first symbol of each data sequence. These bits are set to the "unseen" state discussed above. Initializing the memory as a whole is accomplished by setting the identification and first two data bits on every word to the "empty" state.

COMMAND SET

A conventional random access memory has an instruction set consisting of only two commands, read and write. The apparatus of the present invention by virtue of its increased functionality has 7 commands which are summarized below. These operations are initiated by placing a code on bus 30 which is used by the master control processor 24 to communicate with the data processing system in which the present invention is functioning. Each code can be in the form of a special query symbol or signals on one or more control lines. The master control processor decodes these codes and initiates the proper actions internal to the apparatus of the present invention.

The FIND MATCH and FIND PARTIAL MATCH instructions are carried out in two steps. First, the query sequence is sent to the apparatus of the present invention one symbol at a time on the communication bus 30. Since the beginning and end of the query sequence are marked with special delimiter symbols, the master control processor 24 can ascertain when the last symbol has been received. Once the last query symbol has been stored in the query storage buffer 20, the appropriate bits of each storage word signaling the beginning of a data sequence in the memory are set to the "unseen" state, and the Taps are signaled to perform the matching operation. The FIND PARTIAL MATCH instruction differs from the FIND MATCH instruction only in that it returns all data sequences that begin with the query sequence as opposed to only those data sequences which match the query sequence.

Once a match is found, the GIVE MATCH instruction will result in the master control processor 24 sending the data sequences found to the external data processing system on bus 30. If this operation is given when no match has been found, it is ignored. Each time the instruction is given to the master control processor 24, one of the data sequences which matched the query sequence is transmitted to the external data processing system.

The DELETE MATCH instruction is used to delete a data sequence from the data store. It must be given after a GIVE MATCH instruction in which the data sequence which is to be deleted was sent as a query sequence. This delete instruction results in the identification and data bits of all the words in the data sequence whose address is currently latched on the address bus 36' being set to the "empty" designation discussed above.

The ADD RECORD instruction is used to add a new data sequence to the bit serial data stream 12. The actual insertion of the data sequence is carried out by the input buffer and its related input processor 16 as described in detail below. The master control processor 24 merely relays the data sequence to be inserted to the input buffer 14 on the internal bus 26 as the master control processor 24 receives it on bus 30. After the last symbol of the new data sequence is received, the master control processor 24 signals the input processor 16 to insert the new data sequence.

The INIT. MEMORY and CLEAR TAGS instructions result in the identification bits or the entire data words being cleared, respectively. These instructions are used to clear the memory before loading with the first data sequence.

QUERY STORAGE BUFFER

In the preferred embodiment of the present invention, the query storage buffer 20 is a multi-ported storage buffer for storing the query sequence currently being used to select data sequences from the bit serial data stream 12. A single storage buffer is used to service all of the Taps 18 in order to minimize the storage space needed to hold the query sequence. In addition to storing the query sequence, the query storage buffer is responsible for providing a bit serial representation of the query symbols to the various Taps 18. Each Tap 18 must have independent access to any of the symbols stored in the query storage buffer 20. This is accomplished through an array of switches and pointers. Each Tap 18 controls a pointer which specifies the word in the query storage buffer that is to be routed to it through the array of switches.

The query storage buffer 20 used in the preferred embodiment of the present invention is shown schematically in FIG. 4. It consists of a memory array 80 comprised of a plurality of shift registers 84 as shown in FIG. 4(a), each of which is used for storing one symbol from the query sequence currently being searched. The symbols are loaded into the memory array from the bus by the master control processor 24. In the preferred embodiment, this is accomplished by shifting each successive symbol of the query sequence into the array of shift registers in the direction indicated by the vertical arrow 90. Each of the shift registers 84 recycles its contents by shifting in the direction indicated by the horizontal arrow 92 shown in FIG. 4(a). This recycling operation creates a bit serial stream of data from each word. This bit serial representation of each of the query symbols may be sent to one or more of the Taps 18. As bits are shifted off the end of each shift register they are used as input to the first bit in the register 88 and also as input to one or more of the Tap switches 82. There is one Tap switch 82 for each Tap 18. The choice of which word is sent to a particular Tap 18 is made by setting a query sequence pointer 94 associated with each Tap 18.

Each Tap 18 is serviced by a Tap switch 82 dedicated to that Tap 18 and which runs the entire length of the memory array 80. This switch allows that Tap 18 to receive any query sequence symbol as a bit serial stream. The shift register 84 word that is switched to that Tap 18 is determined by a query sequence pointer 94 which is under the control of the Tap 18 in question. Each query sequence pointer 94 consists of a shift register with one of the bits set to "1" and the remaining bits set to "0". The memory array location at which said "1"

is present is connected to line 56 which is used to communicate a bit serial representation of the query sequence symbol located at that location to the Tap 18 associated with said query sequence pointer 94. Each of these shift registers may be shifted by a signal from the Tap 18 connected to said shift register by signals on a line 55 connecting said Tap 18 to the query storage buffer 20. Each pulse sent results in the query sequence pointer 94 being shifted one word in the memory array 80. The query sequence pointers 94 are set to the first symbol in the query sequence as part of the initialization operations carried out at the beginning of each search under the control of the master control processor 24 which communicates with the query storage buffer control processor 96 over bus 28. Each Tap 18 resets its associated query sequence pointer to the symbol marking the beginning of the query sequence prior to commencing a comparison with the first symbol of a data sequence being read at that Tap 18.

DATA INPUT

Adding a data sequence to the store is complicated by the serial nature of the stored data sequences. Although the absolute location of an individual data sequence is not important, each data sequence must be stored in a contiguous block of storage locations. As data sequences are deleted and new data sequences added to the bit serial data stream 12, the free space may become fragmented and spread throughout the bit serial data stream 12 making it impossible to add a new data sequence even when sufficient free space exists. To correct this problem special hardware is provided to reclaim this space by consolidating free space so that it may be used to store new data sequences. This process is referred to as "Garbage Collection" below.

Garbage Collection is a problem associated with any storage system in which data is stored in data sequences which must occupy contiguous storage words. This problem is usually solved by recopying the data in the memory to a single contiguous block of storage words thus moving any free space between data sequences to one block of storage words, usually at the end of the space used by the data sequences already stored in the memory. This approach requires that the memory be taken out of service during the recopy operation. The present invention avoids this out of service time.

Figure 5A:
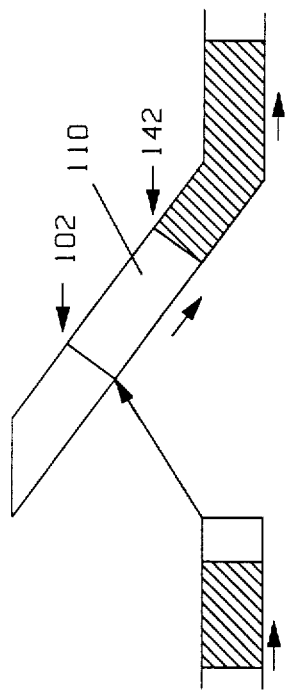
FIGS. 5a, 5b, 5c and 5d illustrates the insertion of new data into the memory in place of one or more blocks of unused space.

In the present invention, the Garbage Collection function is combined with the data input function in a manner that allows Garbage Collection to take place automatically whenever new data sequences are stored in the bit serial data stream 12. The method uses a variable length loop of shift register storage, referred to as the "bubble", which may be inserted into the bit serial data stream 12. Referring to FIG. 5(a), when the bubble 120 is inserted into the bit serial data stream 12, the circulating data in the bit serial data stream 12 leaves the bit serial data stream 12 at a specified point 100, enters the bubble 120 at a point 102 which is determined by the contents of the bubble 120 as explained below, traverses the bubble 120, and re-enters the bit serial data stream 12 at the point 104 that it would have next traversed had the bubble 120 not been inserted.

Figure 5C:
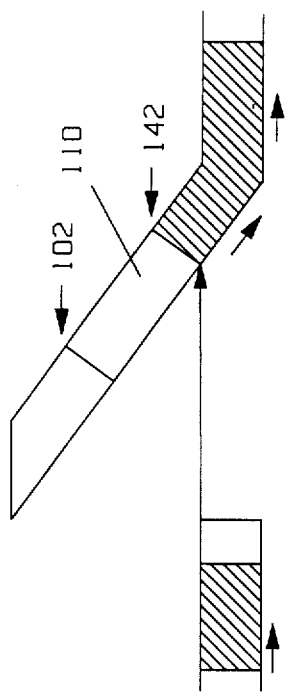
Figure 5B:
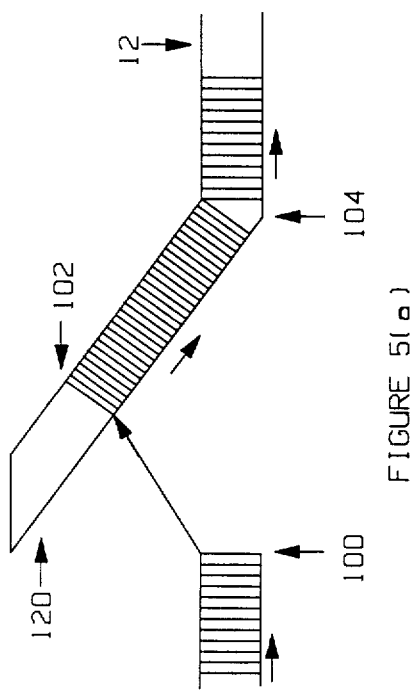

A new data sequence is inserted in the bit serial data stream 12 through the bubble 120. The data sequence is first loaded into the bubble 120 under the control of the master control processor 24. The bubble 120 is then inserted into the bit serial data stream 12 as shown in FIG. 5(a). Referring to FIG. 5(b), as the data in the bit serial data stream 12 circulates into the bubble 120 as indicated by the hatched area 106, the new data sequence stored in the bubble 120 is shifted into the bit serial data stream 12, as indicated by the cross-hatched area at 108. Data is shifted into and out of the bubble 120 as if the bubble 120 were a part of the bit serial data stream 12.

Figure 5D:
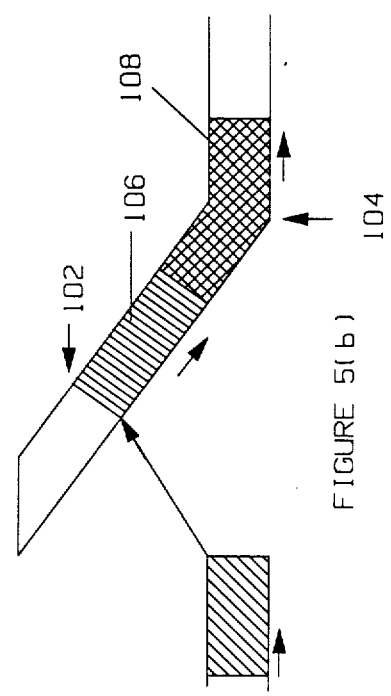

The length of the bubble 120 may be changed by changing the point 102 in the bubble 120 at which the data leaving the bit serial data stream 12 enters the bubble 120. When empty storage words are shifted into the bubble 120, as shown at 110 in FIG. 5(c), the entry point is moved from 102 to a point 142 just ahead of the empty words. This leaves the bubble 120 in the configuration shown in FIG. 5(d). This results in the bubble "shrinking" and the empty words being left in the unused portion of the bubble. When the bubble's length shrinks to zero, the input operation is completed. Hence, whenever a new data sequence is entered, and there is not sufficient contiguous space to store it, two or more smaller spaces will automatically be combined to create a space which is large enough for its storage, and this operation requires no more time than would be required to input the data sequence without Garbage Collection, since other memory functions can continue while the data in the bubble 120 is being inserted.

If a data sequence to be inserted is larger than the bubble 120, it is broken into a series of short insertions, each of which is less than or equal to the maximum length of the bubble 120. After each insertion is made, the input processor 14 which controls the bubble's operation records the location at which the last entry was made. The bubble 120 is then reloaded and inserted when this location passes the bubble insertion point 104.

DETAILED DESCRIPTION OF THE HARDWARE

Implementation

The apparatus of the present invention has been implemented on a single chip using standard CMOS integrated circuit techniques. The bit serial data stream 12 memory is a 32,000 bit shift register constructed using CMOS integrated circuit techniques well known to those skilled in the art of integrated circuit fabrication. This specific embodiment contains 8 Taps 18, and the query storage buffer 20 has 36 words for storing the query sequence.

Figure 6:
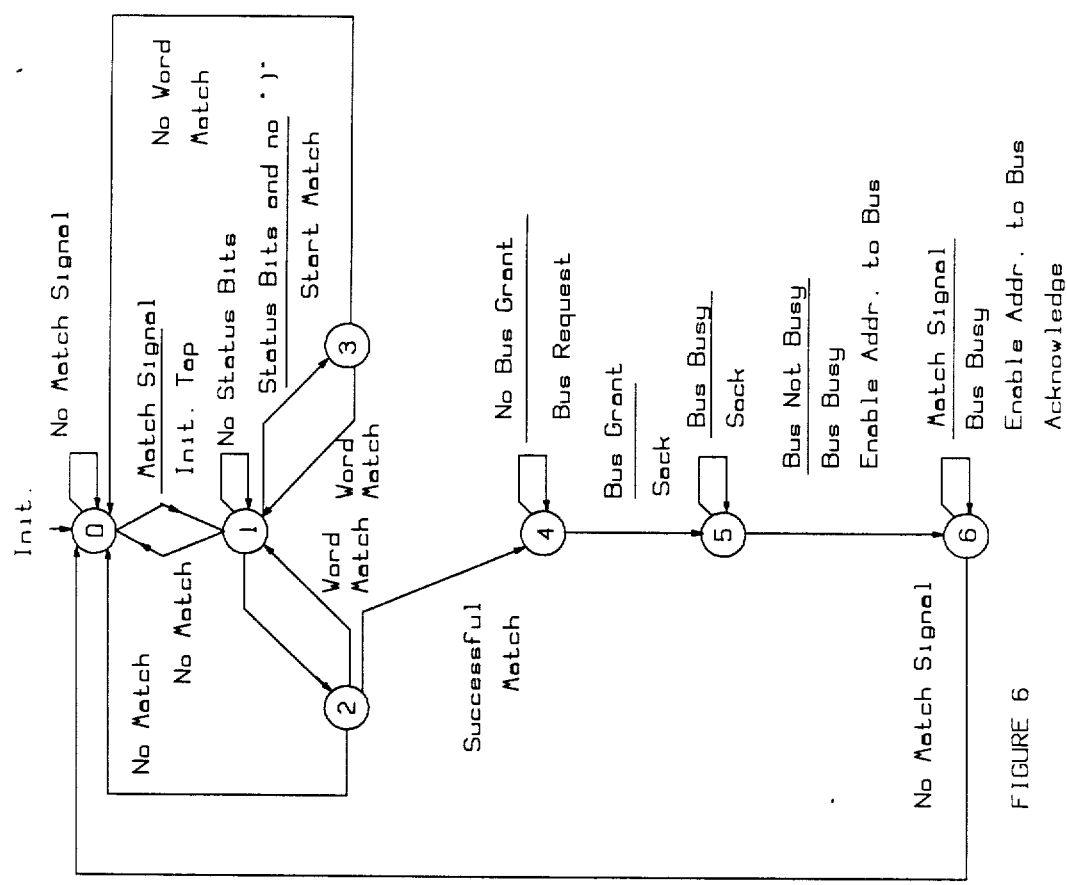
FIG. 6 is a state diagram for the finite state machine used to implement the Taps in the preferred embodiment.

Each of the control circuits discussed above is constructed as a finite state machine in the form of programmed logic arrays using techniques well known to those skilled in the art of circuit fabrication. The indicator advancing circuit 44 in each of the Taps 18 is typical. The algorithm executed by the indicator advancing circuit finite state machine is shown schematically in FIG. 6. This machine can be separated into two parts. The first part is used to detect matches, and the second is used to report a successful match if one is found. Referring to FIG. 6, the transition from the initial state, state 0, to state 1 occurs when the matching function has been requested, the status identification bits of the present data word and query sequence word have been latched in the data status latch 48 and the query status latch 46, respectively, and these identification bits indicate that the data word is the start of an "unseen" data sequence. When these conditions are met, the state machine is initialized and advances to the matching state, marked state 1 in FIG. 6, and the address of the first symbol of the data sequence being examined is latched into the address latch 34 associated with this Tap 18. Matching then proceeds in one of two further states depending on the identification bits of the data and query words in question. If either the data or query word is a closing delimiter, then the machine advances to state 2 and tests are made for the end of the matching operation or other condition associated with a match to a closing delimiter. If neither word involves a closing delimiter, the state machine advances to state 3 where the two words are matched against each other. If the results of the operations in state 3 indicate that the words match, the next query sequence element to be used in the match is specified, and the machine returns to state 1 to await the next match operation between a query sequence word and the next data word in the circulating memory. If the data word is found not to match the query word, the machine returns to state 0. If a match is found, the state machine advances to the second section where matches are reported.

One problem inherent in a circulating storage system is that by the time the data sequence has been determined to match the query sequence, the data sequence has passed the Tap 18 at which the comparisons were made, and hence is not available for read-out at this Tap 18 until it recirculates. The solution to this problem employed in the present invention is to store the starting address of the data sequence being checked when the machine advances from state 0 to state 1 as part of the initialization function. If the data sequence is found to be a match, then this address is communicated to the other Taps 18. When another Tap 18 reads the data sequence at this address, it copies the data stream to the output handler in the master control processor 24. Hence the data sequences may be read out before it recirculates past the Tap 18 at which the match was made. Since all Taps 18 share a common address bus 36' for purposes of this communication, an arbitration scheme similar to that used in the UNIBUS arbitration scheme is used to prevent conflicts on the address bus 36'. This scheme is shown in states 4, 5, and 6 of the state diagram in FIG. 6. The Tap requests a Bus grant by signaling on the FAM line on the bus. When the bus is free, the Tap 18 is given a "grant" which it acknowledges by the "Sack" signal. As soon as the bus is free, the Tap 18 takes control of the address bus 36' by generating a bus busy signal. Once the Tap 18 has taken control of the address bus 36', the address of a matching data sequence will be held on the address bus 36' until the data sequence has been found and output is complete.

Methods for translating the finite state machine logic described above and in FIG. 6 into a programmed logic array for executing the algorithm described above are well known to those skilled in the art of VLSI integrated circuit technology (c.f. J. Millman, MICRO-ELECTRONICS, McGraw-Hill Book Co., 1987). Once the finite state machine functions are defined, a program for a programmed logic array is written. This program may then be implemented in any of a number of systems used to construct such arrays in VLSI circuitry.

A programmed logic array program for implementing the indicator advancing circuit 44 functions discussed above and shown schematically in FIG. 6 is shown in Table 2 as an example of how the functions performed by the various finite state machines used in the preferred embodiment may be implemented. The inputs to the indicator advancing circuit programmed logic array are shown along the top of Table 2 separated by a vertical line from the outputs. Those inputs and outputs which only function in states 4, 5, and 6 are shown along the bottom of Table 2. At any location in the Table at which there is a blank space in an input column, that input is ignored. At any location in Table 2 at which there is a blank in an output column, that output line is not activated. The current state of the finite state machine is encoded in the three "state" bits. State0, State1, and State2. The bits of the query sequence symbol being compared are denoted by "P". P0 and P1 being the identification bits of the current query sequence symbol which have been latched in the query status latch 46 shown in FIG. 3. Pbit and Dbit refer to the current bits in the two bit serial streams which are being compared. The bits associated with the data sequence symbol being compared are denoted by "D". D0 and D1 being the identification bits of the current data symbol which have been latched in the data status latch 48 shown in FIG. 3. The flag is the flag 42 which monitors the output of the exclusive-OR gate 50 shown in FIG. 3. This flag stores the result of the last comparison made by the exclusive-OR gate when the "WE" output signal was "1". The SOR input line indicates that a start of data sequence symbol has been seen by the Tap 18 while the master control processor 24 has requested that a match be made. The "STATUS" input line indicates that the identification bits D0, D1, P0, and P1 have been latched. The "SLOT" input indicates that a new word in the data stream has begun. Finally, the "J=0" line indicates that a sub-expression in the data stream is being skipped by counting open and closing delimiters in the delimiter counter 42 shown in FIG. 3. This input is set to 1 by the initialization signal, INIT., and set to 0 by the COUNT output. The INCR. and DECR. outputs result in this counter being incremented and decremented, respectively. When the counter returns to its initial value, "J=0" is reset from 0 to 1.

The inputs and outputs used exclusively in states 4, 5, and 6 are for implementing the bus arbitration scheme used in the preferred embodiment. The "BG" input indicates that the bus has been "granted" to the Tap 18. If the bus has not been granted, the program maintains the "FAM" signal requesting a bus grant. Once the bus has been granted, the Tap 18 acknowledges the grant by the "Sack" output and enters state 5 where it waits for the bus to be free as indicated by the "Bbsy" input. Once the bus is free, the Tap 18 takes control of the bus through the "Bbsy" output which remains on until the master control processor 24 signals that the data sequence in question has been outputted through the "Ssync" input.

For simplicity, the incomplete match mode in which data sequences which are longer than the query sequence but which begin with the query sequence are also returned has not been shown in the programmed logic array program. Similarly, the programming for the various non-matching functions carried out by the Tap (delete data sequence, initialize memory, etc.) have been omitted.

The logic circuits used in the input processor 16, master control processor 24, and query storage buffer 20 are similarly constructed as finite state machines. Detailed state diagrams for these machines will be obvious to those skilled in the art of VSLI integrated circuit technology.

While various embodiments of the invention have been discussed herein, it will be appreciated that various changes and modifications may be made without departing from the present invention as claimed.

TABLE I

Match Operations Specified Identification Group Comparisons

| Query Sequence I.D. Group | Data Sequence I.D. Group | | | |
|---|---|---|---|---|
| | 00 [Constant] | 01 [)] | 11 [?] | 10 [(] |
| [Constant] 00 | No Name Bits * | No Match Stop | Symbols Match * | No Match Stop |
| [)] 0.1 | Case 1 | Case 2 | Case 3 Check for end of Record Cases 5–8 | Case 4 |
| [?] 11 | Symbols Match*. | Hold query symbol until counter = 0 | Symbols Match* | Hold query symbol until matching ")" passes |
| [(] | Case 9 No Match Stop | Case 10 No Match Stop | Case 11 Jump Query Sequence by number of words coded in data bits | Case 12 Symbols Match * |
| | Case 13 | Case 14 | Case 15 | Case 16 |

*Next symbols to be compared are next symbol in each data stream.

TABLE II

Match State Machine PLA Program

| | Inputs | | | | | | | | | | | | | |
|---|---|---|---|---|---|---|---|---|---|---|---|---|---|---|
| State | SOR | Flag | Pbit | Dbit | P0 | P1 | D0 | D1 | Status | Slot | J=0 | State 0 | State 1 | State 2 |
| 0 | 1 | | | | | | 1 | 0 | 1 | | | 0 | 0 | 0 |
| | | | | | | | | | 0 | | | 1 | 0 | 0 |
| | | | | | 0 | 0 | | | 1 | | | 1 | 0 | 0 |
| 1 | | | | | | | 0 | 0 | 1 | | | 1 | 0 | 0 |
| | | | | | | 1 | 1 | 1 | 0 | 0 | 1 | 0 | 0 | |
| | | | | | 1 | | 1 | | 1 | | | 1 | 0 | 0 |
| | | 1 | 1 | 0 | 0 | 0 | 0 | | | 1 | 0 | 1 | 0 | |
| | | 1 | | | 0 | 0 | | | | 1 | 0 | 1 | 0 | |
| 2 | | | | .1 * | | | 0 | 0 | | | 1 | 0 | 1 | 0 |
| | | | | | | | | | | 0 | 0 | 1 | 0 | |
| | | 0 | 0 | 0 | 0 | 0 | 0 | | | 1 | 0 | 1 | 0 | |
| | 1 | 1 | | 1 | 0 | 1 | 1 | | | 1 | 1 . | 1 | 0 | |
| | 1 | | | 0 | 1 | 0 | 1 | 0 | 1 | 1 | 1 | 0 | | |
| | 1 | | | 0 | 1 | 0 | 1 | 1 | 1 | 1 | 1 | 0 | | |
| 3 | 1 | | | | 1 | 1 | 1 | 0 | 1 | 1 | 1 | 0 | | |
| | 1 | | | 1 | 1 | | 1 | 0 | 1 | 1 | 1 | 0 | | |
| | 1 | | | 1 | | 1 | | 0 | 1 | 1 | 1 | 0 | | |
| | 1 | | | | | | | 0 | 0 | 1 | 1 | 0 | | |
| | 1 | | | 1 | 1 | 1 | 0 | | 0 | 1 | 1 | 1 | 0 | |
| | 0 | | | | | | | | | | 1 | 1 | | |
| 4 | | | | 0 | | | | | | | | 0 | 0 | 1 |
| | | | | 1 | | | | | | | | 0 | 0 | 1 |
| 5 | | | | | 1 | | | | | | | 1 | 0 | 1 |
| | | | | | 0 | | | | | | | 1 | 0 | 1 |
| 6 | | | | | | | 0 | | | | | 0 | 1 | 1 |
| | | | | BG | Bbsy In | Ssync | | | | | | | | |

| | Outputs | | | | | | | | |
|---|---|---|---|---|---|---|---|---|---|
| | State | State 2 | State 1 | State 0 | Init. | Decr. | Incr. | WE | Incr. Blt | Count |
| | 0 | 0 | 0 | 1 | 1 | | | * | | |
| | | 0 | 0 | 1 | | | | | | |
| | | 0 | 1 | 0 | | | | | | |
| | 1 | 0 | 1 | 0 | | | | | | |
| | | 0 | 1 | 1 | | | | | | |
| | | 0 | 1 | 1 | | | | | | |
| | | 1 | 0 | 0 | 1 | | | | | |
| | | 1 | 0 | 0 | 1 | | | | | |
| | 2 | 1 | 0 | 0 | 1 | | | | | |
| | | 0 | 0 | 1 | | 1 | | | | 1 |
| | | 0 | 0 | 1 | | | | | 1 | |
| | | 0 | J | 1 | | | | | 1 | |

TABLE II-continued

Match State Machine PLA Program

|   |   |   |   |   |   |   |   |   |
|---|---|---|---|---|---|---|---|---|
|   | 0 | 1 | 1 |   |   |   | 1 |   |
|   | 0 | 0 | 1 |   |   | 1 | 1 |   |
| 3 | 0 | 0 | 1 |   |   |   | 1 |   |
|   | 0 | 0 | 1 |   |   |   | 1 |   |
|   | 0 | 0 | 1 |   |   |   | 1 |   |
|   | 0 | 0 | 1 |   |   | 1 | 1 |   |
|   | 0 | 0 | 1 |   |   | 1 |   | 1 |
|   | 0 | 0 | 0 |   |   |   |   |   |
| 4 | 1 | 0 | 0 | 1 |   |   |   |   |
|   | 1 | 0 | 1 |   | 1 |   |   |   |
| 5 | 1 | 0 | 1 |   | 1 |   |   |   |
|   | 1 | 1 | 0 |   |   | 1 |   |   |
| 6 | 1 | 1 | 0 |   |   | 1 |   |   |
|   |   |   |   | FAM | Sack | Bbsy out |   |   |

What is claimed is:

1. A memory system for the storage and retrieval of data sequences of symbols comprising:

a circulating memory comprising a first array of memory cells for storing a plurality of said data sequences, each said data sequence comprising a plurality of symbols, and means for causing said symbols to circulate sequentially past a plurality of tap points, said tap points being coupled to said first array of memory cells at mutually exclusive locations in said first array of memory cells;

means for receiving a query sequence of symbols coupled to said memory system including means for initializing said circulating memory each time a said query sequence is received, said initializing means including means for specifying one of two states, compared and not compared, for each said data sequence of symbols, said initializing means specifying the not compared state for each said data sequence of symbols in response to the receipt of said query sequence of symbols, means coupled to said receiving means for storing said query sequence of symbols comprising a second array of memory cells; and means operatively coupled to each said tap point for retrieving a said data sequence of symbols which corresponds to said query sequence of symbols from said first array of memory cells provided said data sequence has not previously been retrieved from said circulating memory since said initializing means initialized said circulating memory, said retrieving means being operative on each said data sequence of symbols in the not compared state, said retrieving means including means for comparing said data sequence of symbols with said query sequence of symbols to determine if said data sequence of symbols corresponds to said query sequence of symbols; means for causing said initialization means to specify the compared state for said data sequence of symbols; and means for outputting said data sequence of symbols if said comparing means determines that said data sequence of symbols corresponds to said query sequence of symbols, said outputting means including means for causing a different said tap point to output said data sequence of symbols if said data sequence of symbols corresponds to said query sequence of symbols.

2. The memory system of claim 1 further comprising means for receiving a said data sequence of symbols coupled to said memory system and for storing said received data sequence of symbols in said first array.

3. The memory system of claim 2 wherein said received data sequence storage means further comprises a third array of memory cells, said third array comprising a plurality of contiguous memory cells having a first memory cell, a last memory cell and means for causing a data symbol to traverse the portion of said third array between an entry point, comprising one of said memory cells and said last memory cell;

means for loading a received data sequence into a contiguous block of memory cells in said third array such that the last symbol of said received data sequence is stored in the last memory cell of said third array and said entry point is the memory cell containing the first symbol of said received data sequence;

means for inserting said portion of said third array into said circulating memory at a predetermined exit point in said circulating memory comprising means for causing data symbols to leave said circulating memory at said exit point, to traverse said portion of said third array and to then re-enter said circulating memory at the memory cell immediately after said exit point in said circulating memory that said symbols would have traversed in said circulating memory had said portion of said third array not been inserted, wherein said entry point is advanced one memory cell toward the last memory cell of third array each time a predetermined symbol enters said third array thereby preventing said predetermined symbol from traversing said portion of said third array; and means for removing said portion of said third array from said circulating memory when said entry point has advanced to said last memory cell of said third array.

4. The circulating memory of claim 3 further comprising means for inserting said portion of said third array of memory cells into said circulating memory when a predetermined sequence of data symbols passes said exit point.

5. The circulating memory of claim 3 further comprising a means for inserting a sequence of symbols into said portion of said third array of memory cells in response to a signal coupled to said memory system.

6. The memory system of claim 3 wherein said first and third memory arrays comprise one bit wide shift registers.

7. The memory system of claim 1 wherein said retrieving means retrieves all data sequences of symbols which are identical to said the query sequence of symbols.

8. The memory system of claim 1 wherein the said data sequences of symbols and said query sequence of symbols are comprised of symbols of three types, delimiters, constants and variables and wherein said retrieving means retrieves all data sequences of symbols which correspond to said query sequence of symbols, a data sequence of symbols being defined as corresponding to said query sequence if the two sequences can be made identical by replacing each variable in each of said sequences by a constant or combination of constants and delimiters, said combination beginning and ending with a delimiter.

9. The memory system of claim 8 wherein said retrieving means comprises a plurality of tap point processors, one such tap point processor being operatively connected to each said tap point, and each said tap point processor comprising:

first indicator means for identifying a data sequence symbol;

second indicator means for identifying a query sequence symbol;

comparing means for comparing the data sequence symbol identified by said first indicating means with the query sequence symbol identified by said second indicator means and for generating an output signal having one of two alternative states, a matched state indicating that the two symbols compared were the same or that at least one of said symbols was a variable, and a not matched state indicating that the two symbols were different and neither was a variable;

flag means responsive to said comparing means output signal for indicating the generation of an output signal having the not matched state;

indicator advancing means comprising means for causing said first indicator means to indicate the first symbol of a selected data sequence, said second indicator means to indicate the first symbol of said query sequence, and said comparing means to compare said identified symbols; and means for causing said first indicator means to identify a next data sequence symbol, said second indicator means to identify a next query sequence symbol, and said comparing means to compare said identified symbols until a termination condition is detected;

means for detecting a termination condition; and means responsive to said termination condition for outputting said selected data sequence if said flag means indicates that none of said comparisons resulted in the generation of a not matched output signal.

10. The memory system of claim 9 wherein said termination condition is defined to occur when said comparing means compares the last symbol of said query sequence to a data sequence symbol.

11. The memory system of claim 9 wherein said termination condition is defined to occur when said comparing means compares the last symbol of a said data sequence to a query sequence symbol.

12. The memory system of claim 9 wherein said termination condition is defined to occur when either said comparing means compares the last symbol of a said data sequence to the last symbol of said query sequence or said comparing means generates an output signal in the not matched state.

13. The memory system of claim 9 wherein
said delimiters occur in corresponding pairs, an open delimiter being used to mark the beginning of a sequence of symbols or of a sub-sequence of symbols embedded in a sequence of symbols and a corresponding closing delimiter being used to mark the end of said sequence of symbols or sub-sequence of symbols, and wherein said indicator advancing means includes means for determining which closing delimiter corresponds to each open delimiter and wherein said next data sequence symbol and said next query sequence symbol caused to be identified by said indicator advancing means are the next adjacent data sequences symbol and query sequence symbol, respectively, unless the previous comparison was between a variable and an open delimiter in which case said next symbols are the next adjacent symbol after said variable and the next adjacent symbol after the closing delimiter corresponding to said open delimiter.

14. The memory system of claim 13 wherein said means for determining which closing delimiter corresponds to a given open delimiter comprises means for storing as part of each open delimiter the location of its corresponding closing delimiter in said sequence of symbols.

15. The memory system of claim 14 wherein each symbol is stored in a contiguous block of one bit memory cells, said block being divided into an identification group and a data group of cells, said identification group comprises two or more cells specifying the type of data symbol stored in said block of one bit memory cells and said data group comprising the remainder of said block of one bit memory cells, and wherein the means of storing the location of a closing delimiter corresponding to any given open delimiter comprises means for causing N of the memory cells in the data group of the block used to store an open delimiter to store the value "1", where N is the number of symbols between said open delimiter and the closing delimiter corresponding to said open delimiter in the sequence of symbols containing said open delimiter.

16. The memory system of claim 15 wherein said second indicator means comprises a pointer in said query sequence storing means, and said indicator advancing means includes means for incrementing said pointer, said pointer being incremented after each comparison between a data sequence symbol and a query sequence symbol which resulted in said matched output being generated by said comparison means, and when an open delimiter query sequence symbol is compared to a variable data sequence symbol, said pointer being incremented once for each data group bit set to a "1" in the data group of the block of one bit storage cells used to store said open delimiter.

17. The memory system of claim 13 wherein said means for determining which closing delimiter in a data sequence of symbols corresponds to a given open delimiter in a said sequence of symbols comprises a means operatively connected to each said tap point processor for counting delimiters in the data sequence of symbols containing said open delimiter, wherein said counting means is initialized to a predetermined count when said open delimiter is read by said reading means, said counting means is incremented each time an open delimiter is read in said data sequence of symbols containing said open delimiter, and said counting means is decremented by an equal amount each time a closing delimiter is encountered in said sequence of symbols, said corresponding closing delimiter being the one causing said counting means to indicate said predetermined count.

18. The memory system of claim 13 wherein said first indicator means comprises a hold means for inhibiting said comparing means, said hold means having two states, ready, or not ready, said not ready state indicating that the data sequence symbol to be compared to the query sequence symbol specified by said second indicating means is not the next symbol to be read at the said tap point and that said comparing means is to be inhibited and said ready state indicating that the data sequence symbol to be compared to the query sequence symbol specified by said second indicating means is the next data sequence symbol to be read at said tap point, wherein said indicator advancing means sets the state of said hold means to the not ready state when a variable query sequence symbol is compared by said comparing means to an open delimiter data sequence symbol, and said indicator advancing means resets said hold means to the ready state when the closing corresponding closing delimiter is read at said tap point.

19. A memory system for the storage and retrieval of data sequences of symbols comprising:

- a circulating memory comprising a first array of one bit memory cells for storing a plurality of said data sequences, each said data sequence including a plurality of symbols, said symbols defined to be of three types, delimiters, constants and variables, said delimiters occurring in corresponding pairs, an open delimiter marking the beginning of a sequence of symbols or subsequence of symbols embedded in a sequence of symbols and the corresponding closing delimiter marking the end of said sequence or subsequence of symbols, each said data sequence symbol being stored in a contiguous block of said one bit memory cells, each said block being divided into an identification group including at least two said memory cells and a data group comprising the remainder of said memory cells in said block, wherein said identification group specifies the type of symbol stored in said block;
- a plurality of tap points said tap points being coupled to said first array of memory cells at mutually exclusive locations in said first array of memory cells;
- means included in said circulating memory for causing a said data sequence stored in said first array to circulate sequentially past each said tap point, including processor means for reading each data symbol stored in said first array as it passes said tap point; and means for receiving a said data sequence of symbols and for storing said data sequence in said first array;
- means for receiving a query sequence of symbols, said query sequence including one or more symbols of the same three types as included in said data sequences of symbols including means for initializing said circulating memory each time a said query sequence is received;
- means for storing said query sequence of symbols comprising a second array of one bit memory cells, wherein each query symbol is stored in a contiguous block of said one bit memory cells, each said block being divided into an identification group including at least two said memory cells for specifying the type of symbol stored in said block and a data group comprising the remainder of said memory cells, and wherein if said identification group specifies that an open delimiter is stored in said block, the location of the closing delimiter corresponding to said open delimiter is stored in the data group of said block, means for selectively coupling each query sequence symbol stored therein to each said processor means, and a plurality of indicating means for specifying which of said query sequence symbols is selected one said indicating means corresponding to each said processor means and being responsive thereto;
- each said processor means comprising:
- means for comparing the query sequence symbol specified by the said indicating means corresponding to said processor means with the data sequence symbol currently being read by said processor means, said comparing means generating a matched output signal if said symbols are the same or if one of said symbols is a variable, said comparing means generating a not matched signal if said symbols are different and neither is a variable;
- flag means having two alternative states for indicating the generation of any output signal being in the not matched state, said flag means being responsive to said comparing means output signal;
- delimiter determining means for determining which data sequence closing delimiter corresponds to a given data sequence open delimiter comprising means for counting delimiters in the data sequence of symbols containing said open delimiter, wherein said counting means is initialized to a predetermined count when said open delimiter is read by said processor means, said counting means is incremented each time an open delimiter is read in the data sequence of symbols containing said open delimiter, and said counting means is decremented by an equal amount each time a closing delimiter is encountered in said sequence of symbols, said corresponding closing delimiter being indicated by said counting means when said counting means indicates said predetermined count;
- hold means included in said delimiter determining means for preventing said comparing means from comparing two symbols, wherein said hold means has two states, ready and not ready, said not ready state indicating that the data sequence symbol to be compared to the query sequence symbol specified by the said indicating means corresponding to said processor means is not the next symbol to be read by said processor means and said ready state indicates that the data sequence symbol to be compared to the query sequence symbol specified by the said indicating means corresponding to said processor means is the next data sequence symbol to be read at said processor means, and wherein
- said processor means sets the state of said hold means to the not ready state when a variable symbol in said query sequence is compared by said comparing means to an open delimiter symbol in said data sequence; and said processor means resets said hold means to the ready state when the closing delimiter symbol in said data sequence corresponding to said open delimiter symbol in said data sequence is compared to said variable symbol by said processor means;
- indicator advancing means for causing the said indicating means corresponding to said processor means to specify the next query sequence symbol to be coupled to said processor means by said query sequence symbol coupling means in said means for storing query sequence of symbols comprising means for identifying the closing query sequence delimiter corresponding to a given query sequence open delimiter in said query storing means, means for causing said flag means to have the state indicating that no output signal in the not matched state had been generated, and the said indicating means corresponding to said processor means to indicate the first symbol of said query sequence when the first symbol of a selected data sequence is read at said tap point, and for causing said first data sequence symbol and said first query sequence symbol to be compared by said comparing means, and means included in said indicator advancing means for repetitively causing the said indicating means corresponding to said processor means to specify a next query symbol to be compared to the next data sequence symbol to be read by said processor means at its corresponding tap point when said hold means is in the ready state and for causing said query and data symbols to be compared by said comparing means until a termination condition is detected; wherein said next query sequence symbol is the next adjacent symbol following the previously specified query sequence symbol in said query sequence unless the previous comparison made by said comparing means was between a variable data sequence symbol and an open delimiter query sequence symbol, in which case the next query sequence symbol is the next adjacent symbol following the closing delimiter corresponding to said open delimiter in said query sequence;

means included in said indicator advancing means for detecting said termination condition; and means for outputting a data sequence of symbols if the said flag means of any of said processor means indicates that all of the previous comparisons resulted in a matched output signal being generated for said data sequence and said data sequence has not previously been outputted by a said outputting means of another said processor means since said initializing means initialized said circulating memory.

20. The memory system of claim 19 wherein said termination condition is defined to occur when said comparing means compares the last query symbol of said query sequence to a data sequence symbol.

21. The memory system of claim 19 wherein said termination condition is defined to occur when said comparing means compares the last data symbol of a data sequence to a query sequence symbol.

22. The memory system of claim 19 wherein said termination condition is defined to occur when either said comparing means compares the last data symbol of a data sequence to the last symbol of said query sequence or an output signal in the not matched output state is generated by said comparing means.

23. The memory system of claim 19 wherein said means for determining the closing query sequence delimiter corresponding to a given open query sequence delimiter comprises means for reading the location of said closing delimiter from the data group of the block of memory cells storing said open delimiter.

24. The memory system of claim 19 wherein said means for receiving a data sequence and storing said data sequence in said first array of memory cells further comprises a third array of memory cells, said third array comprising a plurality of contiguous memory cells having a first memory cell, a last memory cell and means for causing a data symbol to traverse the portion said memory array between an entry point, comprising one of said memory cells and said last memory cell thereof;

means for loading a received data sequence into a contiguous block of memory cells in said third array such that the last symbol of said received data sequence is stored in the last memory cell of said third array and said entry point is the memory cell containing the first symbol of said received data sequence;

means for inserting said portion of said third array into said circulating memory at a predetermined exit point in said circulating memory, means for causing data symbols to leave said circulating memory at said exit point, to traverse said portion of said third array and to then re-enter said circulating memory at the memory cell immediately after said exit point in said circulating memory that said symbols would have traversed in said circulating memory had said portion of said third array not been inserted, wherein the location of said entry memory cell in said third array is advanced one memory cell toward the last memory cell of said third array each time a predetermined symbol enters said third array thereby preventing said symbol from traversing said portion of said third array; and means for removing said portion of said third array from said circulating memory when said entry point has advanced to said last memory cell of said third array.

25. The circulating memory of claim 24 further comprising means for inserting said portion of said third array into said circulating memory when a predetermined sequence of data sequence symbols passes said exit point.

26. The memory system of claim 24 wherein said first and third memory arrays are comprised of one bit wide shift registers.

27. A memory system comprising:

circulating store means including a plurality of storage words for storing a plurality of data sequences of symbols, and means for causing each said symbol of each said data sequence to sequentially circulate through all said storage words;

means for storing a query sequence of symbols;

means for accessing said circulating store means at a plurality of tap points, each said tap point being coupled to a different said storage word, each said tap point including means for reading each data symbol as it passes said tap point;

means connected to each said tap point read means for comparing said read data sequence of symbols with said query sequence of symbols and for generating a match signal indicating the identity of said read data sequence of symbols when said data sequence of symbols corresponds to said query sequence of symbols, said comparing means further including means for communicating the identity of said data sequence of symbols to at least one other said tap point; and output means connected to each said tap point and responsive to the receipt of a said match signal for reading out a said matched data sequence of symbols from said circulating store means, said matched data sequence of symbols being read out of the first tap point which reads the first symbol of said matched data sequence after said match signal is generated by a said generating means, said output means including means for generating a signal indicating that said matched data sequence of symbols has been read out and for coupling said signal to each said tap point.

* * * * *

UNITED STATES PATENT AND TRADEMARK OFFICE
CERTIFICATE OF CORRECTION

PATENT NO. : 4,924,435
DATED : May 8, 1990
INVENTOR(S) : Brunvand, et al.

It is certified that error appears in the above-identified patent and that said Letters Patent is hereby corrected as shown below:

Column 1, Line 39, delete "data base" and insert therefor --database--.

Column 2, Line 5, delete "auxillary" and insert therefor --auxiliary--.

Column 2, Line 18, delete "become" and insert therefor --becomes--.

Column 4, Line 51, insert "," therefor after --Then--.

Column 5, Line 44, delete "stradegies" and insert therefor --strategies--.

Column 9, Line 42, delete "serial" before --data--.

Column 12, Line 7, delete "in" after --discussed--.

Column 12, Line 15, delete " "1". " and insert therefor --"1"s.--.

Column 12, Line 16, delete " "1"'s " and insert therefor --"1"s--.

Column 15, Line 40, insert "," therefor after --words--.

Column 22, Line 23, delete "," after --point--.

Column 22, Line 45, insert "said" therefor after --of--.

UNITED STATES PATENT AND TRADEMARK OFFICE
CERTIFICATE OF CORRECTION

PATENT NO.  : 4,924,435

DATED       : May 8, 1990

INVENTOR(S) : Brunvand, et al.

It is certified that error appears in the above-identified patent and that said Letters Patent is hereby corrected as shown below:

Column 0, [75] Inventors, delete "Eric" and insert therefor --Erik--.

Column 0, [57] Abstract, delete "to" and insert therefor --too--.

Column 4, Line 40, delete "Choice of Memory Organization" and insert therefor --CHOICE OF MEMORY ORGANIZATION--.

Column 7, Line 24, delete "made-up" and insert therefor --made up--.

Column 16, Line 39, delete "Implementation" and insert therefor --IMPLEMENTATION--.

Column 17, Line 35, delete "sequences" and insert therefor --sequence--.

Column 18, Line 3, delete "vertical" and insert therefor --horizontal--.

Column 18, Line 5, delete "along the bottom of" and insert therefor --at the bottom of the corresponding section in--.

Column 19-20, Line 58, delete "Blt'after --Incr.--.

Column 19-20, Line 58, insert "Bit" after--Incr.--.

UNITED STATES PATENT AND TRADEMARK OFFICE
CERTIFICATE OF CORRECTION

PATENT NO. : 4,924,435
DATED : May 8, 1990
INVENTOR(S) : Brunvand, et al.

It is certified that error appears in the above-identified patent and that said Letters Patent is hereby corrected as shown below:

Column 24, Line 11-12, delete "sequences" and insert therefor --sequence--.

Column 24, Line 29, delete "comprises" and insert therefor --comprising--.

Column 25, Line 20, delete "closing" after --the--.

Column 26, Line 7, insert "," therefor after --selected--.

Column 26, Line 48-49, delete "indicates" and insert therefor --indicating--.

Column 28, Line 5, insert "of" therefor after --portion--.

Signed and Sealed this

First Day of September, 1992

*Attest:*

DOUGLAS B. COMER

*Attesting Officer*     *Acting Commissioner of Patents and Trademarks*